United States Patent [19]
Kosaka et al.

[11] Patent Number: 5,369,378
[45] Date of Patent: Nov. 29, 1994

[54] DIGITAL DQPSK MODULATOR

[75] Inventors: Akio Kosaka, Gifu; Mitsufumi Yoshimoto, Nara; Mitsuji Hama, Daito; Toshinori Iinuma, Gifu, all of Japan

[73] Assignees: Sanyo Electric Co., Ltd., Osaka; Tottori Sanyo Electric Co., Ltd., Tottori, both of Japan

[21] Appl. No.: 971,315

[22] Filed: Nov. 4, 1992

[30] Foreign Application Priority Data

Feb. 13, 1992 [JP] Japan .................. 4-026731
Feb. 13, 1992 [JP] Japan .................. 4-026732

[51] Int. Cl.⁵ .............. H03C 3/00; H04L 27/10; H04L 27/20
[52] U.S. Cl. .................. 332/104; 375/56; 375/57; 375/67
[58] Field of Search .............. 332/103, 104; 375/52, 375/53, 54, 55, 56, 57, 67

[56] References Cited

U.S. PATENT DOCUMENTS

| | | | |
|---|---|---|---|
| 4,584,540 | 4/1986 | DuBose et al. | 332/9 |
| 5,115,468 | 5/1992 | Asahi et al. | 375/61 X |
| 5,140,613 | 8/1992 | Birgenheier et al. | 332/103 X |
| 5,157,693 | 10/1992 | Lemersal, Jr. et al. | 332/103 X |
| 5,175,514 | 12/1992 | Iinuma et al. | 332/103 |
| 5,177,455 | 1/1993 | Bennett | 532/103 |
| 5,177,769 | 1/1993 | Arnold et al. | 375/60 |
| 5,225,795 | 7/1993 | Iinuma | 332/100 |

OTHER PUBLICATIONS

Yongacoglu et al., "Differential Detection of GMSK Using Decision Feedback", *IEEE Transactions on Communications*, vol. 36, No. 6, Jun. 1988, pp. 641–649.

Murota et al., "GMSK Modulation for Digital Mobile Telephony", *IEEE Transactions on Communications*, vol. com-29, No. 7, Jul. 1981, pp. 1044–1050.

*Primary Examiner*—David Mis
*Attorney, Agent, or Firm*—Peter L. Michaelson

[57] ABSTRACT

A digital DQPSK modulator according to the present invention limits respective bands of symbol mapping data of I phase and Q phase obtained by applying differential encoding and mapping processings to a digital baseband signal, and multiplies the obtained data by the carrier signals by means of the digital filter. Such limiting of the bands and multiplication by the carrier signals are carried out by the digital filter in a time-divisionally multiplexed manner. The digital filter includes a circuit, for accumulating symbol mapping data for each of the I phase and the Q phase corresponding to a plurality of symbol sections, a plurality of ROMs corresponding to the plurality of symbol sections for storing a multiplication result of symbol data corresponding to a predetermined filter waveform and the carrier signal, and an adder for adding data output from these ROMs. The adder outputs a digital modulated signal which is, in turn, converted into an analog modulated signal by a D/A converter.

3 Claims, 17 Drawing Sheets

FIG. 9

| PHASE POINT | SM 2 | SM 1 | SM 0 | I 1 | I 0 | Q 1 | Q 0 |
|---|---|---|---|---|---|---|---|
| 0 | 0 | 0 | 0 | 1 | 1 | 1 | 0 |
| 1 | 0 | 0 | 1 | 1 | 0 | 1 | 1 |
| 2 | 0 | 1 | 0 | 0 | 1 | 1 | 1 |
| 3 | 0 | 1 | 1 | 0 | 0 | 1 | 0 |
| 4 | 1 | 0 | 0 | 0 | 0 | 0 | 1 |
| 5 | 1 | 0 | 1 | 0 | 1 | 0 | 0 |
| 6 | 1 | 1 | 0 | 1 | 0 | 0 | 0 |
| 7 | 1 | 1 | 1 | 1 | 1 | 0 | 1 |

25A
SYMBOL MAPPING DATA ACCUMULATION CIRCUIT

FIG. 11

| $\omega_c t$ | $\cos \omega_c t$ | $-\sin \omega_c t$ |
|---|---|---|
| $0 + 2n\pi$ | 1 | 0 |
| $\pi/4 + 2n\pi$ | 0 | $-1$ |
| $\pi/2 + 2n\pi$ | $-1$ | 0 |
| $3\pi/4 + 2n\pi$ | 0 | 1 |

FIG. 12

| $\omega_c t$ | $S(t) = i(t)\cos\omega_c t - q(t)\sin\omega_c t$ |
|---|---|
| $0 + 2n\pi$ | $i(t)$ |
| $\pi/4 + 2n\pi$ | $-q(t)$ |
| $\pi/2 + 2n\pi$ | $-i(t)$ |
| $3\pi/4 + 2n\pi$ | $q(t)$ |

DIGITAL DQPSK MODULATOR

BACKGROUND OF THE INVENTION

1. Field of the Invention

The present invention relates generally to digital modulators, and more particularly, to a digital modulator used as a MODEM for a digital communication equipment such as a land mobile radio telephone, a portable radio telephone and a cordless telephone.

2. Description of the Background Art

A conventional digital communication apparatus modulates a carrier signal in response to a digital information signal (baseband signal) to transmit the information signal in order to achieve efficient transmission.

Such modulation systems include an amplitude modulation system wherein an amplitude of a carrier signal is changed in response to a digital baseband signal (a modulating wave signal), a frequency modulating system wherein a frequency of a carrier is deviated in response to a modulating wave signal, a phase modulating system wherein a phase of a carrier is changed in response to a modulating wave signal and an amplitude phase modulating system wherein an amplitude and a phase of a carrier are individually changed in response to a modulating wave signal.

The carrier signal (modulated signal) S(t) thus modulated in response to a modulating wave signal can be generally expressed by the following equation.

$$\begin{aligned} S(t) &= A(t)\cos\{\omega_c t + \phi(t)\} \\ &= A(t)\cos\phi(t) \cdot \cos\omega_c t - \\ & \quad A(t)\sin\phi(t) \cdot \sin\omega_c t \\ &= i(t)\cos\omega_c t - q(t)\sin\omega_c t \end{aligned} \quad (1)$$

Herein, A(t) denotes an amplitude, $\omega_c$ denotes a carrier frequency and $\phi(t)$ denotes a phase of a modulating wave signal.

As is clear from the above-described equation (1), the modulated signal can be represented by two components orthogonal to each other, that is, by a sum of an in-phase (I phase) component (the first term of the above-described equation (1)) and a quadrature phase (Q phase) component (the second term of the above-described equation (1)). Such a modulated signal can be therefore formed by using a quadrature modulator.

FIGS. 1 and 2 are a block diagram and a spatial diagram schematically showing the principle of such a quadrature modulator, respectively. It should be noted that the following example shows a phase modulating system for changing a phase of a carrier in response to a baseband signal, wherein an amplitude A (t) is fixed to "1".

With reference to FIG. 1, a mapping circuit 2 outputs I phase and Q phase components of a modulating wave signal as rectangular signals i(t) and q(t) in response to a digital baseband signal applied through an input terminal 1. The I phase component i(t) is applied to one input of a multiplier 7 through a low pass filter (LPF) 3, while the Q phase component q(t) is applied to one input of a multiplier 8 through a low pass filter LPF 4.

A carrier signal cosset is applied from a signal source 5 to the other input of the multiplier 7 which outputs an I phase component $\cos\phi(t)\cdot\cos\omega_c t$ of a modulated signal. A signal $-\sin\omega_c t$ obtained by shifting the phase of the carrier signal from the signal source 5 by $\pi/2$ by means of a phase shift circuit 6 is applied to the other input of the multiplier 8 which outputs Q phase component $-\sin\phi(t)\cdot\sin\omega_c t$ of the modulated signal. Thus obtained I phase component and Q phase component can be represented in a one-to-one correspondence on the I and Q coordinates as shown in FIG. 2.

These I phase component and Q phase component are added to each other by an adder 9 to become such a modulated signal as expressed by equation (1), which signal is output from an output terminal 10.

The above described mapping circuit 2 includes two ROMs wherein signal waveform data, which have been obtained in advance by calculation, of I and Q phases of the digital modulating wave signal with their bands being limited are stored, respectively. Such waveform data are read out from the ROMs using the digital baseband signal applied through the input terminal 1 as addresses. Digital data read out from the ROMs for respective ones of the I phase and the Q phase are converted into analog signals separately by means of D/A converters contained in the mapping circuit 2 to be supplied as the above described signals i(t) and q(t).

There is a case where M-phase PSK (Phase Shift Keying) signal is generated by using such a quadrature modulator. FIG. 3 is a diagram schematically showing the principle of the generation of $\pi/4$ shift QPSK (Quadrature Phase Shift Keying) signal, which signal is one example of such a M-phase PSK signal.

With reference to FIG. 3, it is assumed that a signal point corresponding to I phase component and Q phase component data of a baseband signal (modulating wave signal) at a certain time point exists at one of points a, c, e and g on the unit circle having a radius of 1 shown in FIG. 3. At a subsequent time point after a lapse of a predetermined time slot, the signal point shifts to one of the intersections b, d, f and h between two virtual axis obtained by rotating the I axis and the Q axis by $\pi/4$ and the unit circle of a radius of 1. The I axis and the Q axis will be rotated by $\pi/4$ for each predetermined time slot in the same manner as described above, whereby the signal point sequentially shifts on the unit circle.

For example, if the signal point initially exists at the point a in FIG. 3 and the baseband signal does not change, the signal point shifts as a point→b point→c point→d point→e point→f point→g point→h point for every predetermined time slot, that is, at every $\pi/4$ rotation of the I axis and the Q axis. In this case, the I and Q phase data each takes the five types of values such as "1", "$1/\sqrt{2}$", "0", "$-1/\sqrt{2}+$" and "$-1$" as can be seen from FIG. 3.

On the other hand, according to the digital cellular telecommunication system standard of Japan (RCR) and the cellular telecommunication standard (TIA-IS-54) of the North America, differential encodings are carried out in $\pi/4$ shift QPSK modulation. Because of such differential encoding, it is only necessary to consider a relative phase between continuous symbols. Therefore, by shifting the phase of the signal spatial diagram of FIG. 3 by $\pi/8$ as shown in FIG. 4, data of the I phase and the Q phase have levels of four values. Such $\pi/4$ shift QPSK modulation by such differential encoding is generally referred to as "$\pi/4$ shift DQPSK modulation".

On the other hand, a digital quadrature modulator has been proposed wherein multiplication data of a baseband signal i(t) of the I phase and one carrier signal $\cos\omega_c t$ has been calculated in advance and stored in one ROM for the I phase and multiplication data of a baseband signal q(t) of the Q phase and another carrier signal $-\sin\omega_c t$ has been calculated in advance and stored in another ROM for the Q phase and outputs of the respective ROMs are added to each other and a result of addition is converted into an analog signal. Such digital quadrature modulator is disclosed in U.S. application Ser. No. 823,246 filed Jan. 21, 1992, now U.S. Pat. No. 4,225,795 and commonly assigned with the present invention. According to such disclosed technique, only one D/A converter is sufficient as compared with the conventional example shown in FIG. 1. In addition, since the quadrature modulation is carried out in a digital manner, there is another advantage that no vector errors are caused as compared with a case wherein the quadrature modulation is carried out in an analog manner as shown in FIG. 1.

According to such digital quadrature modulation technique, however, even if each of the multiplication results $i(t) \cos \omega_c t$ and $-q(t) \sin \omega_c t$ of the baseband signals and the carrier signals is "0", such data "0" have to be stored in ROMs for the I phase and the Q phase, resulting in difficulty in reducing ROM capacity. Such difficulty in reducing the ROM capacity also makes it difficult to implement the modulator itself as an LSI circuit and also increases its manufacturing cost.

In a conventional digital modulator, on the other hand, it was not considered how to cope with burst transmission. Burst transmission without considering any countermeasure results in generation of spurious (undesired) transmissions.

More specifically, in the normal burst transmission, the data transmission in effected intermittently as shown in FIG. 5A(a). As shown therein, if the time width of transmission is defined as $T_B$ (sec), the spectrum as expressed by the following equation is generated.

$$A_D(f) = T_B \frac{\sin \pi f T_B}{\pi f T_B} \quad (3)$$

FIG. 5B is a graph showing such spectrum wherein a spurious transmission is caused by the portion indicated with hatching.

In order to prevent generation of such spurious transmissions, a generally-called ramp processing for smooth rise and fall of burst as shown in FIG. 5A(b) is required.

FIG. 5A(c) is an enlarged diagram showing transmission waveform in such rising and falling. The following function is used as a function for rising.

$$\frac{1}{2} - \frac{1}{2} \cos \pi \left( \frac{t}{2T_s} \right) \quad (3)$$

The following function is used as a function for falling.

$$\frac{1}{2} + \frac{1}{2} \cos \pi \left( \frac{t}{2T_s} \right) \quad (4)$$

In the above equations (3) and (4), "$T_s$" indicates the symbol period.

However, a conventional system needs an additional ROM dedicated for such a ramp processing. A digital modulator applicable to burst transmission by a conventional system inevitably requires an ROM of a larger capacity.

SUMMARY OF THE INVENTION

An object of the present invention is to provide a digital modulator which can be readily implemented as an LSI circuit and manufactured at low cost.

Another object of the present invention is to provide a digital modulator structured without using a large capacity ROM.

A further object of the present invention is to provide a digital modulator applicable to burst transmission without increasing a capacity of an ROM.

In short, the present invention relates to a digital modulator, which includes a circuit for supplying a digital baseband signal, a circuit for performing a differential encoding processing and a mapping processing for the digital baseband signal to convert the signal into a pair of symbol mapping data corresponding to in-phase and quadrature phase, respectively, a digital filter for limiting respective bands of the pair of symbol mapping data corresponding to in-phase and quadrature phase and multiplying the symbol mapping data with carrier signal data, the limiting and multiplying being carried out in a time-divisionally multiplexed manner, and a D/A converters for converting outputs of the digital filter into an analog baseband signal.

According to another aspect of the present invention, the digital filter includes a circuit for accumulating each of the pair of symbol mapping data corresponding to in-phase and quadrature phase by the amount corresponding to a plurality of symbol sections in a time-divisionally multiplexed manner, a plurality of ROMs provided corresponding to the plurality of symbol sections for storing data corresponding to a multiplication result of the symbol mapping data passed through a filter having predetermined characteristics and the corresponding carrier signal data, and an adder for adding the data read out from the plurality of ROMs.

According to a further aspect of the present invention, the digital modulator further comprises a circuit for designating burst transmission, and the digital filter further includes a plurality of masking circuits for selectively rendering the symbol data read out from the plurality of ROMs to "0", and a mask control circuit responsive to designation of burst transmission by the burst transmission designating circuit for controlling the masking circuits in a predetermined timing.

Therefore, a principal advantage of the present invention resides in that a digital modulator can be readily implemented as an LSI circuit while reducing manufacturing cost because the digital modulator can be implemented with a ROM capacity considerably smaller than that of a conventional digital modulator.

A further advantage of the present invention is to implement a digital modulator applicable to burst transmission in which generation of spurious transmission can be prevented at the time of burst transmission without increasing ROM capacity.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a truth table for illustrating the principle of a mapping operation shown in FIG. 8.

FIGS. 11 and 12 are tables for illustrating the feature of the digital modulator according to the first embodiment of the present invention.

DESCRIPTION OF THE PREFERRED EMBODIMENTS

Figure 6:
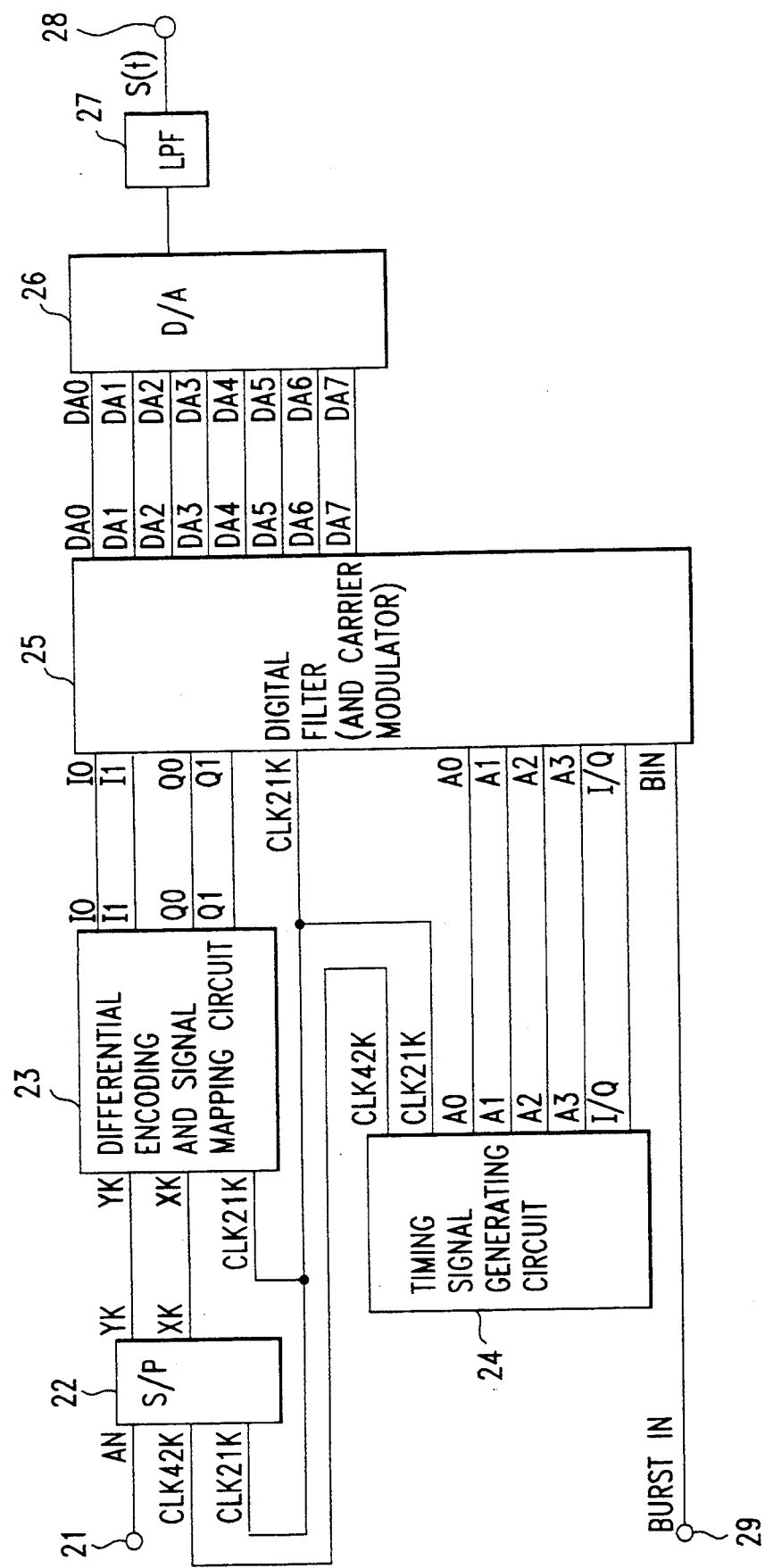
FIG. 6 is a block diagram schematically showing a digital modulator according to a first embodiment of the present invention.

FIG. 6 is a diagram showing an entire digital modulator based on the π/4 shift DQPSK modulation system according to a first embodiment of the present invention.

In the embodiment shown in FIG. 6, the above described differential encoding is carried out in π/4 shift DQPSK modulation, so that each of the symbol mapping data of the I phase and Q phase has four levels. This embodiment is also intended for providing a method wherein a digital filter is structured by a plurality of ROMs each of which separately stores a multiplication result corresponding to each symbol section and obtained by multiplying a baseband signal, with its band being limited by a route Nyquist filter, by a carrier signal, so that outputs of the ROMs are added. Hereinafter, such method will be referred to as symbol tap divided ROM method.

With reference to FIG. 6, a serial baseband signal AN applied through an input terminal 21 is converted into parallel 2-bit data (YK, XK) by a serial/parallel conversion circuit 22. A differential encoding and mapping circuit 23 differentially encodes the current 2-bit data from the serial/parallel conversion circuit 22 and 2-bit data of an immediately preceding clock and performs mapping on the signal spatial diagram. A timing signal generation circuit 24 is driven by a clock signal having a frequency (for example, 256 times as large as that of a symbol rate, that is, 5.376 MHz) higher than the symbol rate (21 KHz) to generate a clock signal (CLK42K) for an input signal, a clock signal (CLK21K) having a symbol period, and clock signals (A0, A1, A2, A3) and an I/Q switching signal (I/Q) for a digital filter.

Symbol mapping data (I0, I1) of the I phase and symbol mapping data (Q0, Q1) of the Q phase output from the differential encoding and mapping circuit 23 are applied to a digital filter and carrier modulator 25 (hereinafter simply referred to as digital filter 25) which outputs 8-bit digital data (DA0–DA7) corresponding to a multiplication result of the symbol mapping data with its band being limited and the carrier using the symbol mapping data as an address.

The 8-bit data (DA0–DA7) is converted into an analog signal by a D/A converter 26. This analog signal is applied to an LPF27 wherein sampling noise is removed, and then it is supplied through an output terminal 28 as an analog modulated signal S(t).

Figure 7:
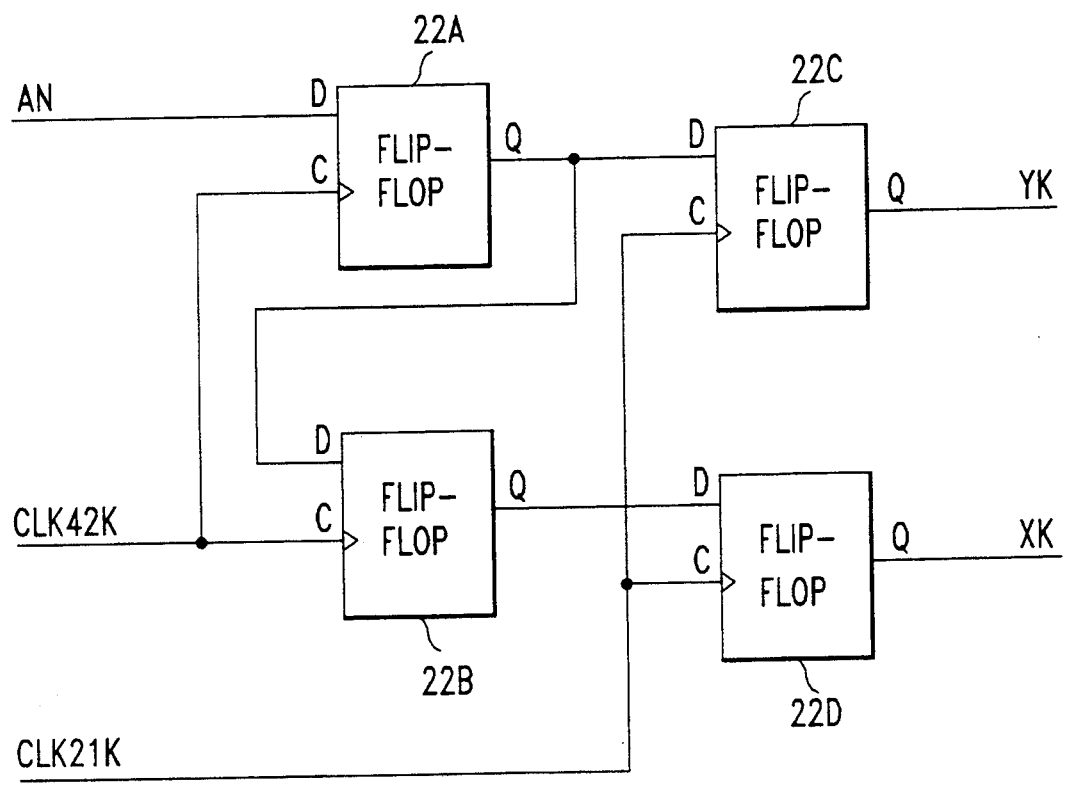
FIG. 7 is a diagram showing a serial/parallel conversion circuit of FIG. 6 in detail.

FIG. 7 is a diagram showing the serial/parallel conversion circuit 22 of FIG. 6 in detail. The serial/parallel conversion circuit 22 is structured by four flip-flops 22A, 22B, 22C and 22D as shown in FIG. 7. The serial data AN input through the input terminal 21 (FIG. 6) is sampled by a clock signal CLK 42K (42KHz) having a data rate applied from the timing signal generation circuit 24 and accumulated by two bits in the flip-flops 22A and 22B. The accumulated data are further sampled by a clock signal CLK21K (21KHz) having a symbol period applied from the timing signal generation circuit 24 and output as 2-bit parallel data (YK, XK).

Figure 1:
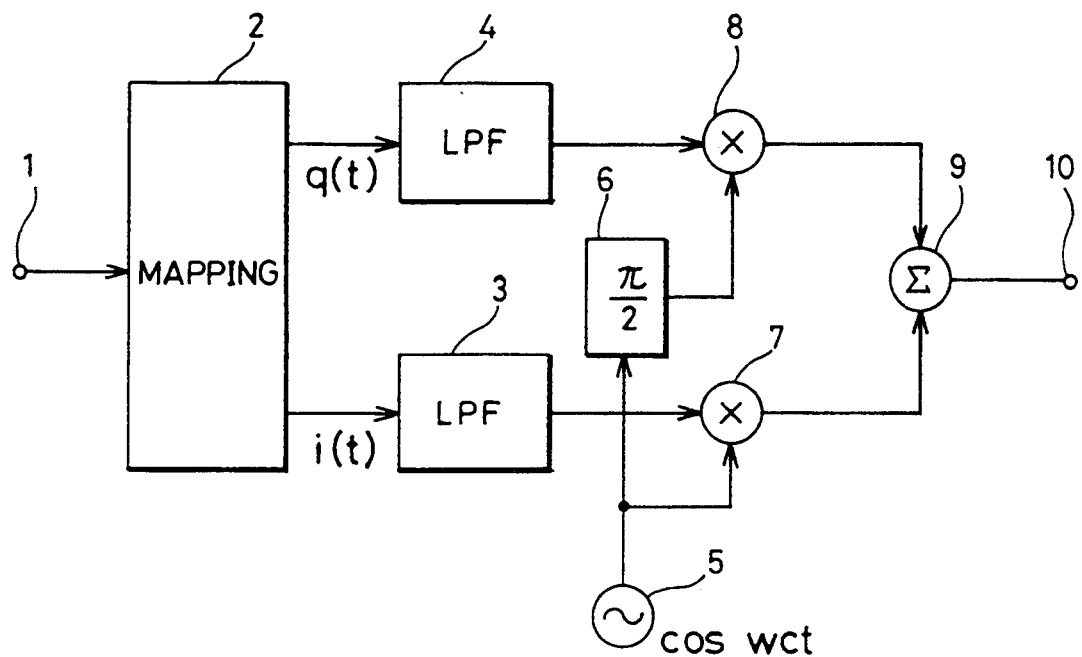
FIG. 1 is a block diagram schematically showing the principle of a conventional quadrature modulator.
Figure 2:
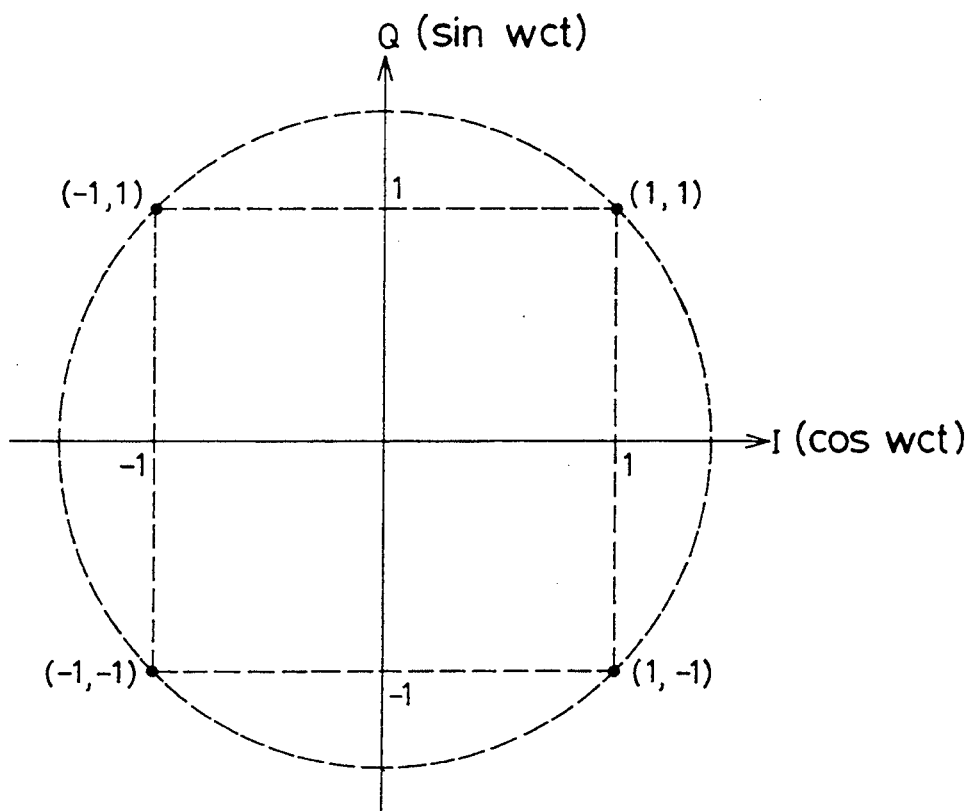
FIG. 2 is a spatial diagram schematically showing the principle of the conventional quadrature modulator.
Figure 3:
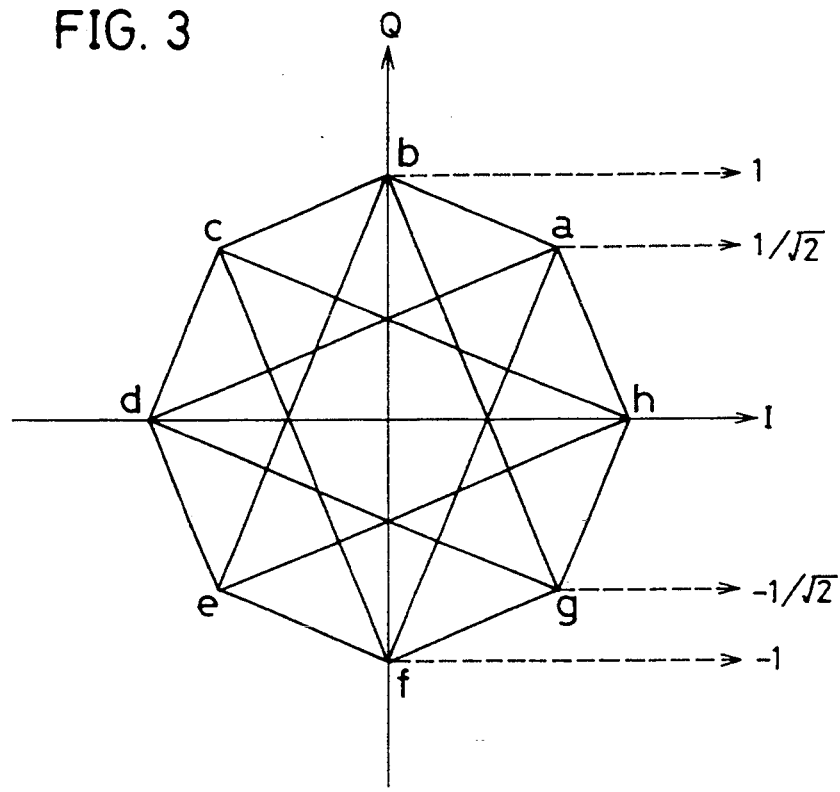
FIG. 3 is a diagram schematically illustrating the principle of generation of a π/4 shift QPSK signal.
Figure 4:
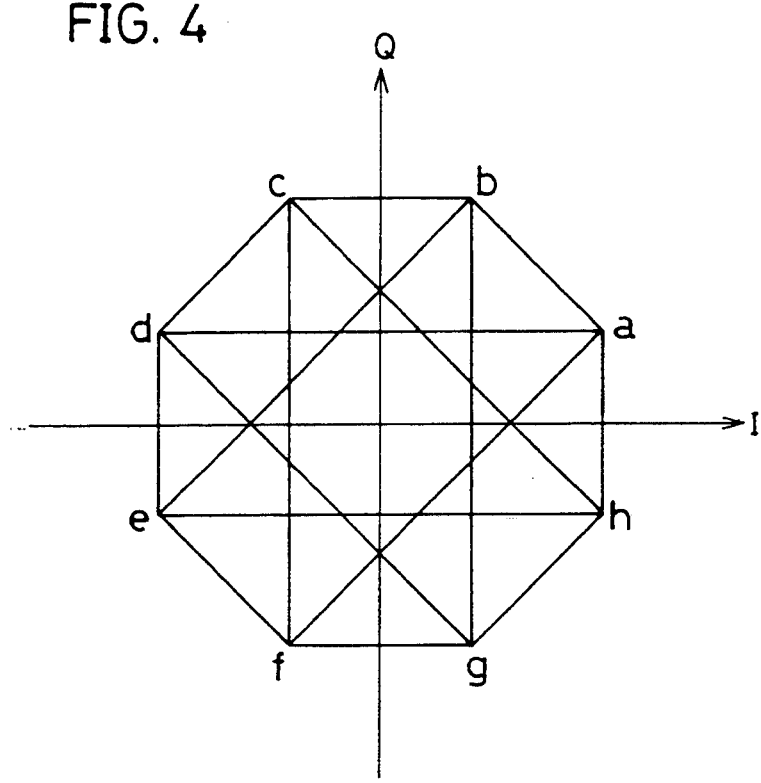
FIG. 4 is a diagram schematically showing the principle of differential encoding.
Figure 5A:
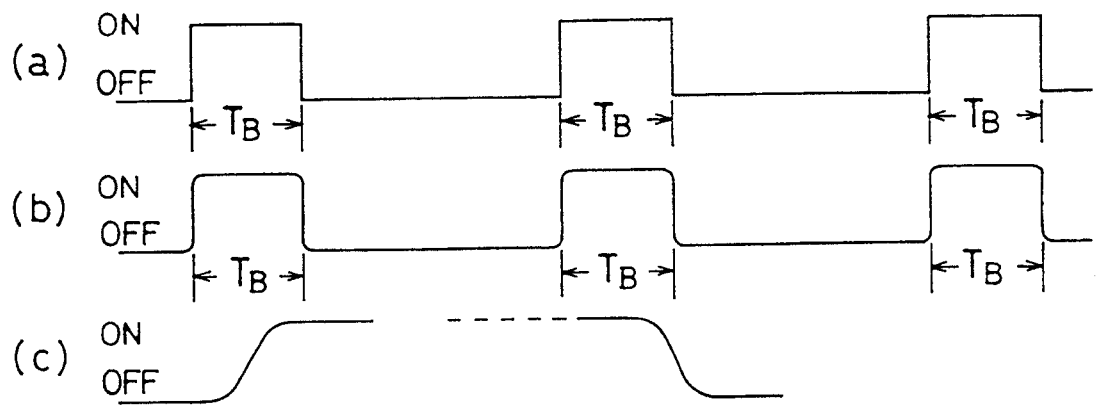
FIGS. 5A and 5B are diagrams which illustrate the generation of spurious transmissions.
Figure 5B:
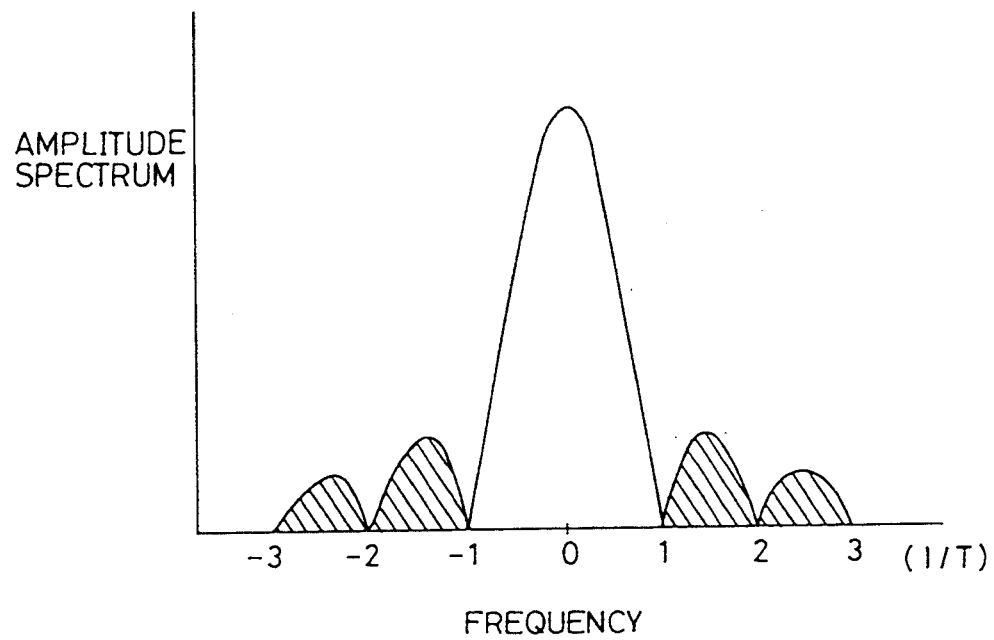
Figure 8:
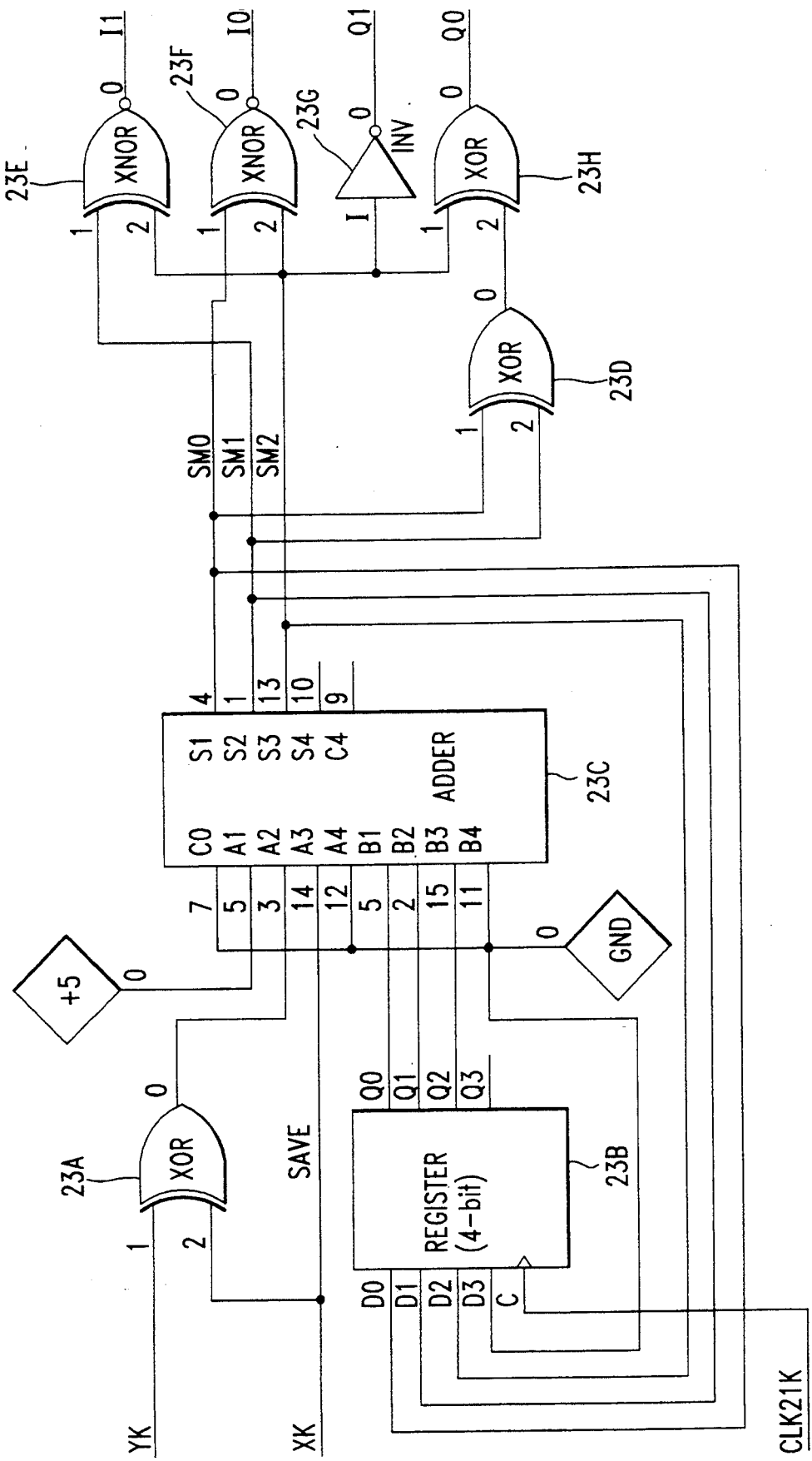
FIG. 8 is a diagram showing a differential encoding and mapping circuit of FIG. 6 in detail.

FIG. 8 is a diagram showing the structure of the differential encoding and mapping circuit 23 of FIG. 6 in detail. The differential encoding and mapping circuit 23 carries out differential encoding and mapping of the 2-bit data (XK, YK) applied from the above-described serial/parallel conversion circuit 22. Herein, there exist eight points as indicated by a–h in FIG. 4 necessary for presenting phases in case of π/4 shift DQPSK.

Figure 19:
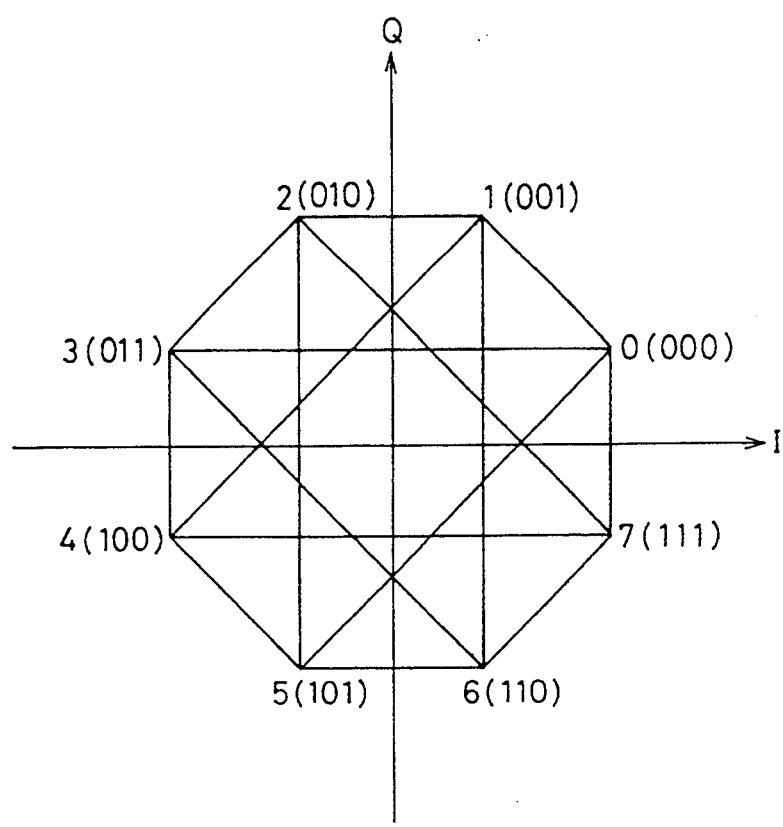
FIG. 19 is a diagram schematically illustrating the principle of operation of the differential encoding and mapping circuit.

For simplification of calculation, the phase states of these points a–h are expressed in decimal notation such as "0", "1", "2", "3", "4", "5", "6" and "7" for "a", "b", "c", "d", "e", "f", "g" and "h", respectively (see FIG. 19).

A numerical value among 0–7 indicative of phase point of a current symbol is obtained by adding "1", "3", "5" and "7" to the numerical value among 0–7 indicative of a phase point of an immediately preceding symbol, when the 2-bit data (XK, YK) of the current symbol is (0, 0), (0, 1), (1, 1) and (1, 0) respectively, and performing MOD8 operation on the result. The MOD8 operation is an operation of obtaining residues of division of a certain numerical value by 8. Since the numerical values of 0–7 indicative of the phase points are operated in the form of 3-bit binary codes in the actual circuit shown in FIG. 8, the numerical values of 1, 3, 5 and 7 to be added to a numerical value of a phase point of an immediately preceding symbol are binary-encoded by using an exclusive OR gate EXOR23A. In addition, the numerical value among 0 –7 at a phase point of an immediately preceding symbol is stored in a 4-bit parallel resistor 23B.

The 3-bit data output from the EXOR23A and the 3-bit data output from the 4-bit parallel resistor 23B are added to each other by an adder 23C to obtain 3-bit outputs SM0, SM1 and SM2. Mapping operation of logic circuits 23D, 23E, 23F, 23G and 23H based on the 3-bit data SM0, SM1 and SM2 generate symbol mapping data I0, I1, Q0 and Q1. In other words, out of the above-described logic circuits, the exclusive NOR gate EXNOR23E is used to output the symbol mapping data I1, the exclusive NOR gate EXNOR23F to output the symbol mapping data I0, the inverter 23G to output the symbol mapping data Q1 and the exclusive OR gates EXOR23D and 23H to output the symbol mapping data Q0. The mapping operation is carried out following the truth table shown in FIG. 9.

Figure 10:
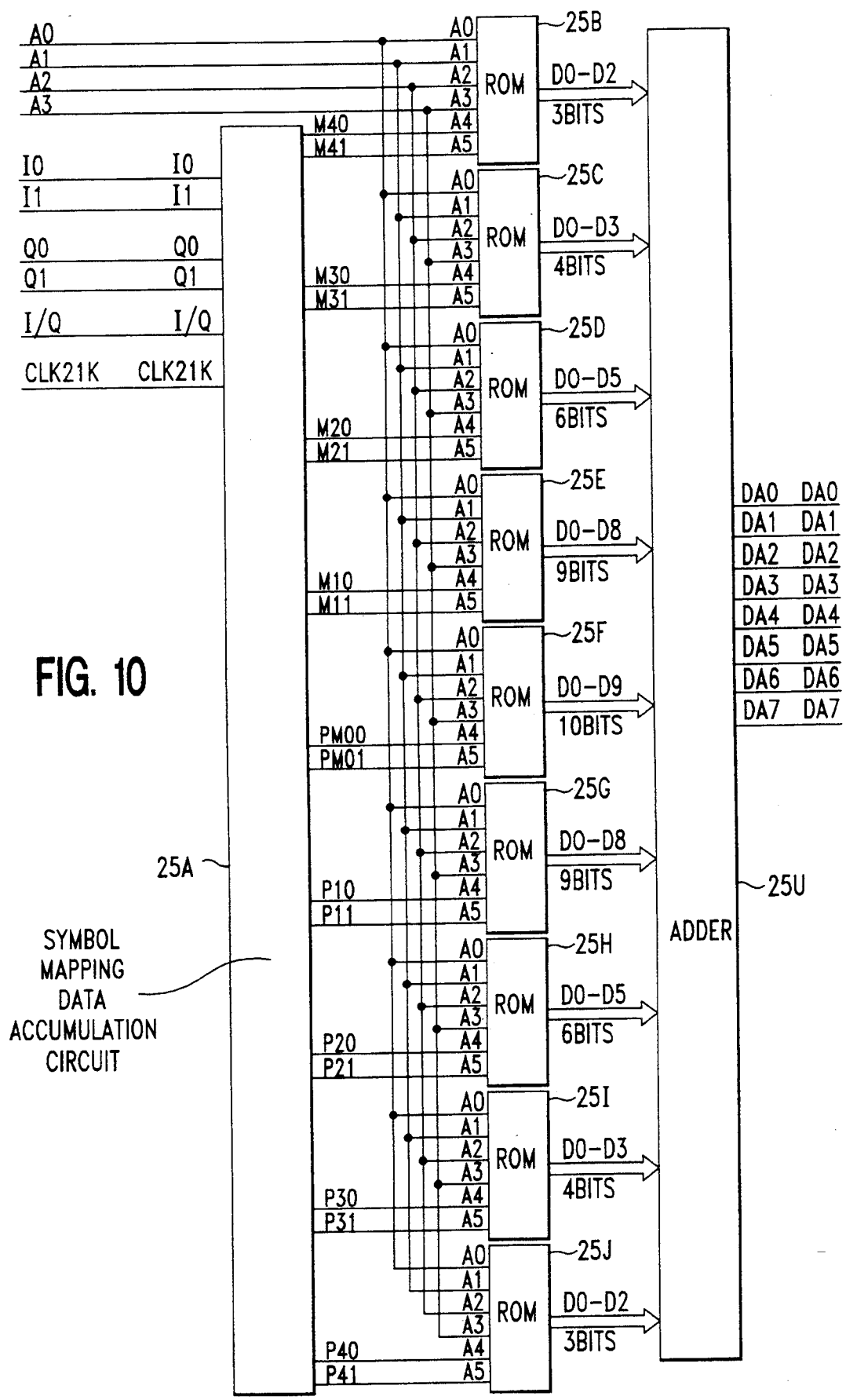
FIG. 10 is a diagram showing the detailed structure of the digital filter shown in FIG. 6.

FIG. 10 is a diagram showing the digital filter 25 of FIG. 6 in detail. This digital filter of FIG. 10 basically uses the symbol tap divided ROM method as described in the foregoing, and it is assumed in the example of FIG. 10 that the data corresponding to four symbol sections preceding to the center symbol section and succeeding four symbol sections, that is, corresponding to the total of 9 symbol sections (9, the number of taps of ROM) are accumulated and data obtained by multiplying the baseband signal passed through the route Nyquist filter by the carrier signal based on a clock signal having a frequency four times as large as that of the carrier signal is output.

The principle of the digital filter of the digital modulator according to the first embodiment will be described in the following. FIG. 11 is a table showing the relation between carrier signals $\cos \omega_c t$ and $-\sin \omega_c t$ to be multiplied with baseband signals i(t) and q(t) of the I phase and the Q phase and $\omega_c t$. As a result of the relation shown in the table of FIG. 11, the relation between the quadrature modulated output S(t) and $\omega_c t$ can be obtained as shown in the table of FIG. 12.

As can be seen from the relation shown in FIG. 12, the quadrature modulated output S(t) can be obtained by alternately outputting I component and Q component in such order as i(t), −q(t), −i(t), q(t), ---, without any necessity of adding I component and Q component with each other. In addition, the quadrature modulated output S(t) can be obtained by using a single digital filter in a time-divisionally multiplexed manner without providing respective digital filters of the I phase and the Q phase. In other words, in this embodiment, the capacity of the ROMs constituting the digital filter can be reduced by not storing corresponding data when each of i(t) cos $\omega_c t$ and −q(t) sin $\omega_c t$ is "0", and the circuit configuration can be further simplified by using a single digital filter in a time-divisionally multiplexed manner.

The structure of the digital filter 25 will be described in detail with reference to FIG. 10.

Referring to FIG. 10, the symbol mapping data accumulation circuit 25A is time-divisionally used for the I phase and the Q phase to accumulate, by the amount equivalent to 9 symbol sections, the symbol mapping data (I0, I1) of the I phase or the symbol mapping data (Q0, Q1) of the Q phase supplied from the differential encoding and mapping circuit 23 and shifted by a clock signal CLK21K (21KHz) having a symbol period supplied from the timing signal generation circuit 24.

Figures 13, 13A:
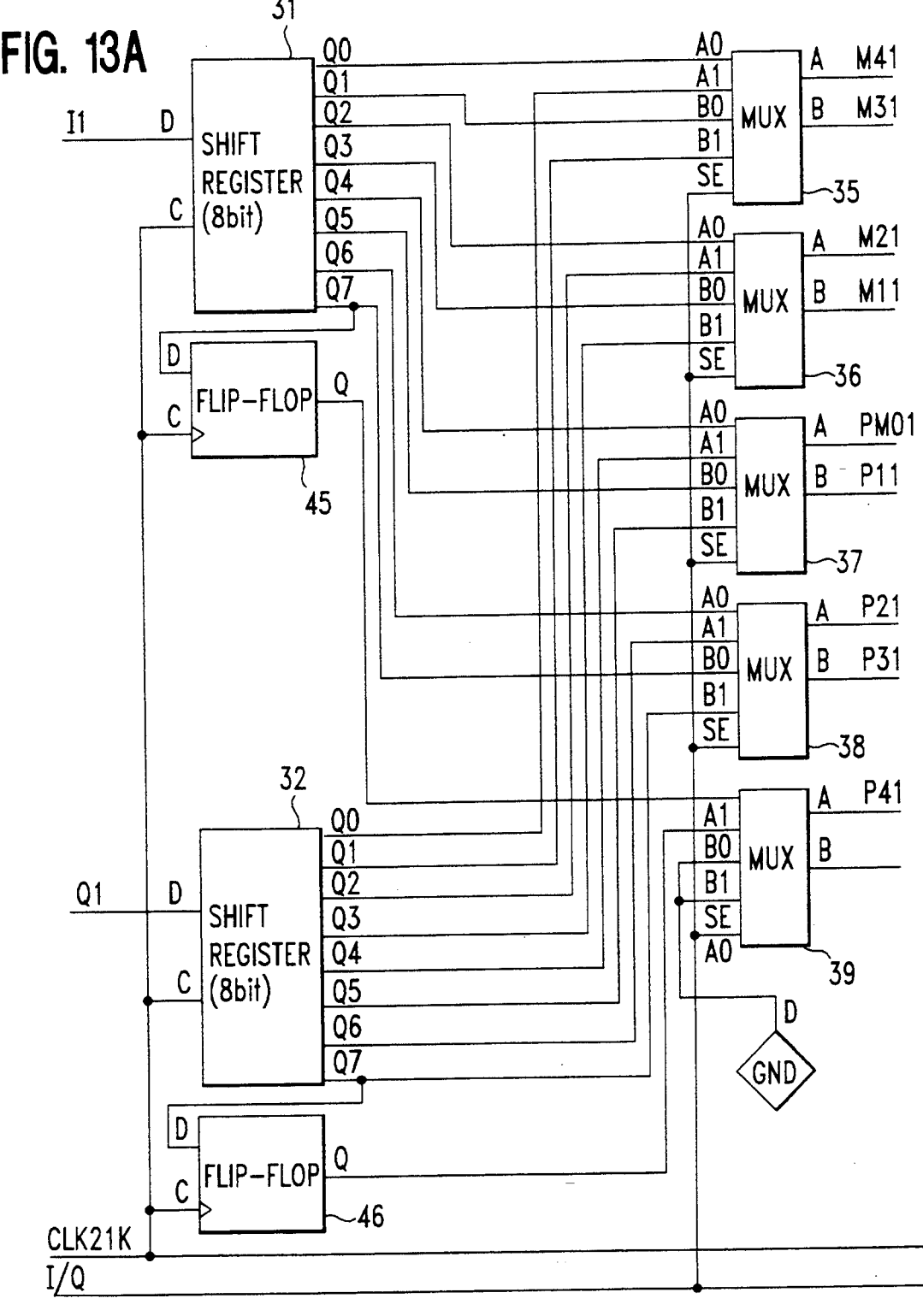
FIG. 13 shows the proper orientation of the drawing sheets for FIGS. 13A and 13B.
FIGS. 13A and 13B collectively show; a diagram showing the detailed structure of a symbol mapping data accumulation circuit shown in FIG. 6.
Figure 13B:
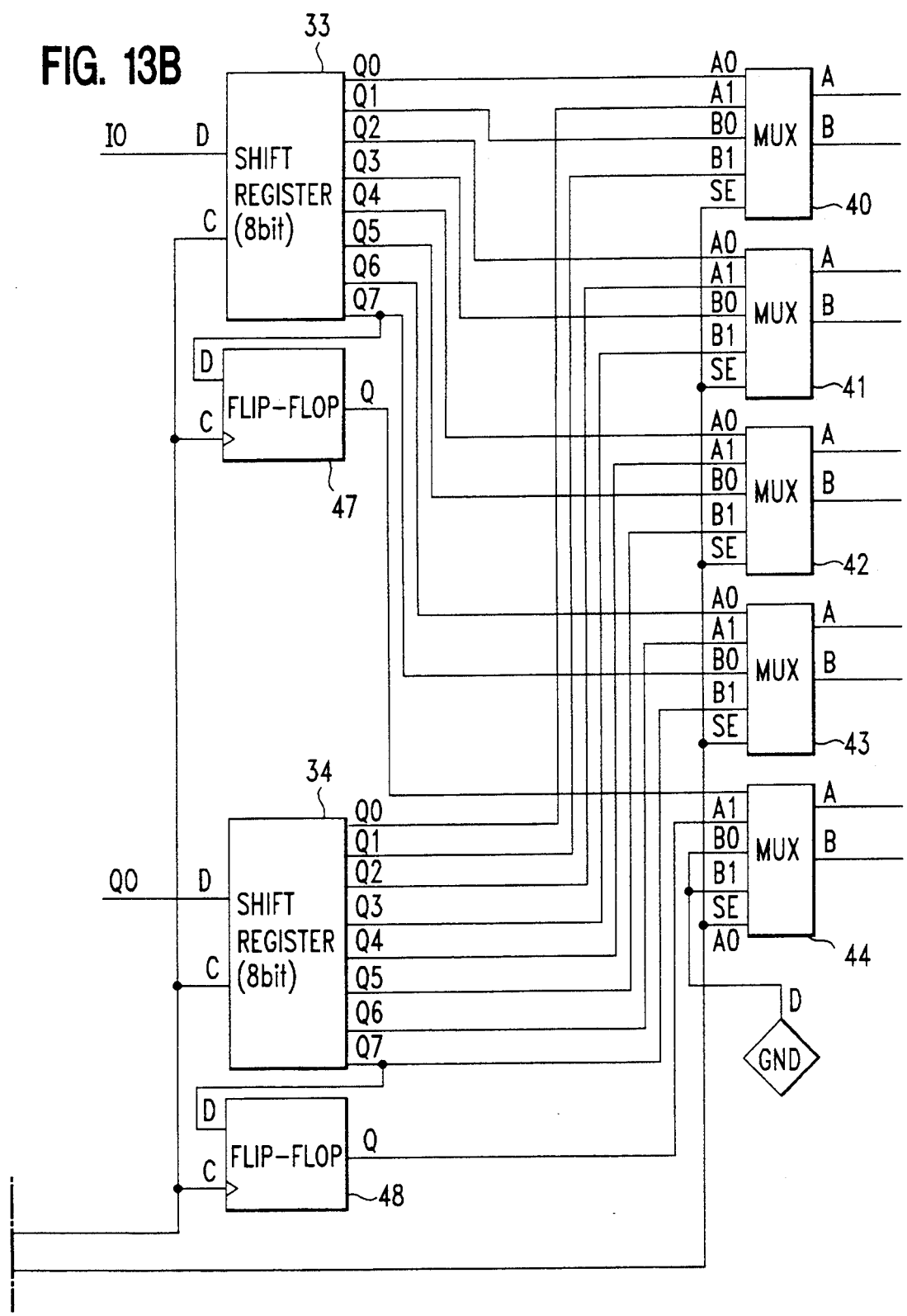

FIGS. 13A and 13B collectively show a diagram showing the structure of such symbol mapping data accumulation circuit 25A in detail. As shown in FIGS. 13A and 13B, the symbol mapping data accumulation circuit 25A is structured by four 8-bit shift resistors 31–34, ten 2-bit data selectors (multiplexers) 35–44 and four flip-flops 45–48. Each of the 2-bit data selectors 35–44 selectively outputs 2-bit symbol mapping data of the I phase or 2-bit symbol mapping data of the Q phase in response to an I/Q switching signal supplied from the timing signal generation circuit 24 of FIG. 6.

Figure 14:
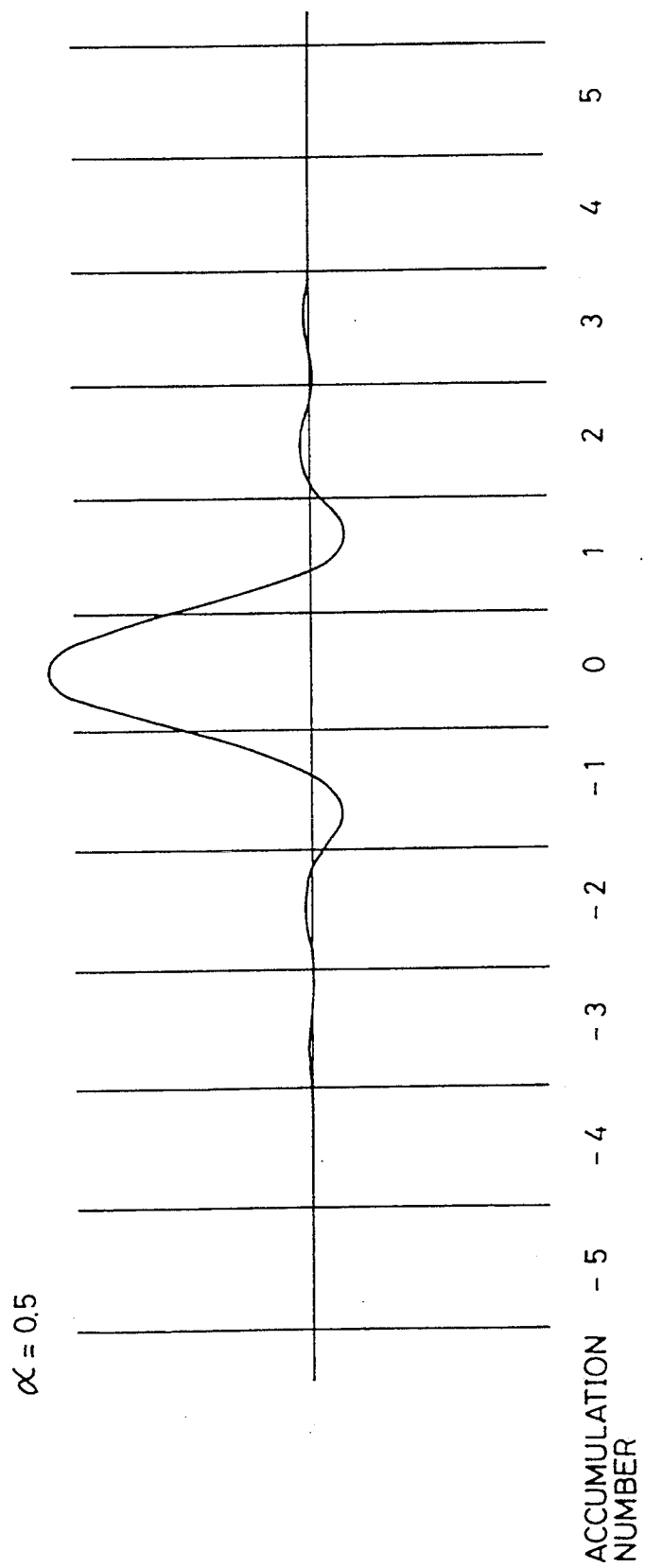
FIG. 14 is a waveform diagram illustrating impulse response characteristics of the digital filter shown in FIG. 10.

With reference to FIG. 10, 18-bit (=2×9) symbol mapping data for nine symbol sections output from the symbol mapping data accumulation circuit 25A are applied to corresponding ROMs 25B–25J for respective symbol sections. Each of these ROMs uses its corresponding 2-bit symbol mapping data (A4, A5) from the symbol mapping data accumulation circuit 25A and 4-bit (16 values) time information (A0, A1, A2, A3) from the timing signal generation circuit 24 as addresses. Each ROM stores data other than "0" of multiplication result of the baseband signal, with its band being limited by a route Nyquist filter having impulse response characteristics shown in FIG. 14, and the carrier signal in the corresponding symbol section. A data length stored in each ROM varies from one ROM to another depending on a dynamic range in each symbol section of an impulse response waveform of a route Nyquist filter having a roll off factor $\alpha$ of 0.5 shown in FIG. 14.

More specifically, the ROM25B corresponds to a symbol section of the accumulation number of −4, and the ROM25J corresponds to a symbol section of the accumulation number of 4; both of these ROMs providing output symbol data (D0–D2) of a 3-bit data length in consideration of a dynamic range of each symbol section. Similarly, the ROM25C corresponds to a symbol section of the accumulation number of −3 and the ROM25I corresponds to a symbol section of the accumulation number of 3; both of these particular ROMs providing output symbol data (D0–D3) of a 4-bit data length. The ROM25D corresponds to a symbol section of the accumulation number of −2, and the ROM25H corresponds to a symbol section of the accumulation number of 2; both of these particular ROMs providing output symbol data (D0–D5) of a 6-bit data length. The ROM25E corresponds to a symbol section of the accumulation number of −1, and the ROM25G corresponds to a symbol section of the accumulation number of 1; both of these specific ROMs supplying output symbol data (D0–D8) of a 9-bit data length. Lastly, the ROM25F corresponds to a symbol section of the accumulation number of 0 and supplies output symbol data (D0–D9) of a 10-bit data length.

The outputs of the ROMs 25B–25J are added by an adder 25U to be changed into a 8-bit digital baseband signal. The output of the adder 25U essentially should be of 10 bits because the output of the ROM25F corresponding to a symbol section of the accumulation number of 0 is of 10 bits. However, in consideration of an increase in error included in LSB as a result of addition, the output is set to be of 8-bit by omitting two least significant bits.

An ROM capacity of the first embodiment is as follows. That is, an address of each of ROMs 25B–25J has 6 bits (=4+2) and each data length varies from one ROM to another as described in the foregoing. Provided are two 3-bit ROMs, two 4-bit ROMs, two 6-bit ROMs, two 9-bit ROMs and one 10-bit ROM. The sum total of the capacities of the nine ROMs is therefore expressed as follows.

$$2^{(4+2)} \times 3 \times 2 + 2^{(4+2)} \times 4 \times 2 + \\ 2^{(4+2)} \times 6 \times 2 + 2^{(4+2)} \times 9 \times 2 + \\ 2^{(4+2)} \times 10 \times 1 = 3456 \text{ bits}$$

As described in the foregoing, the first embodiment of the present invention can realize a digital modulator having an extremely small ROM capacity. It is therefore possible to make a digital modulator easily as an LSI while reducing a manufacturing cost.

Figure 15:
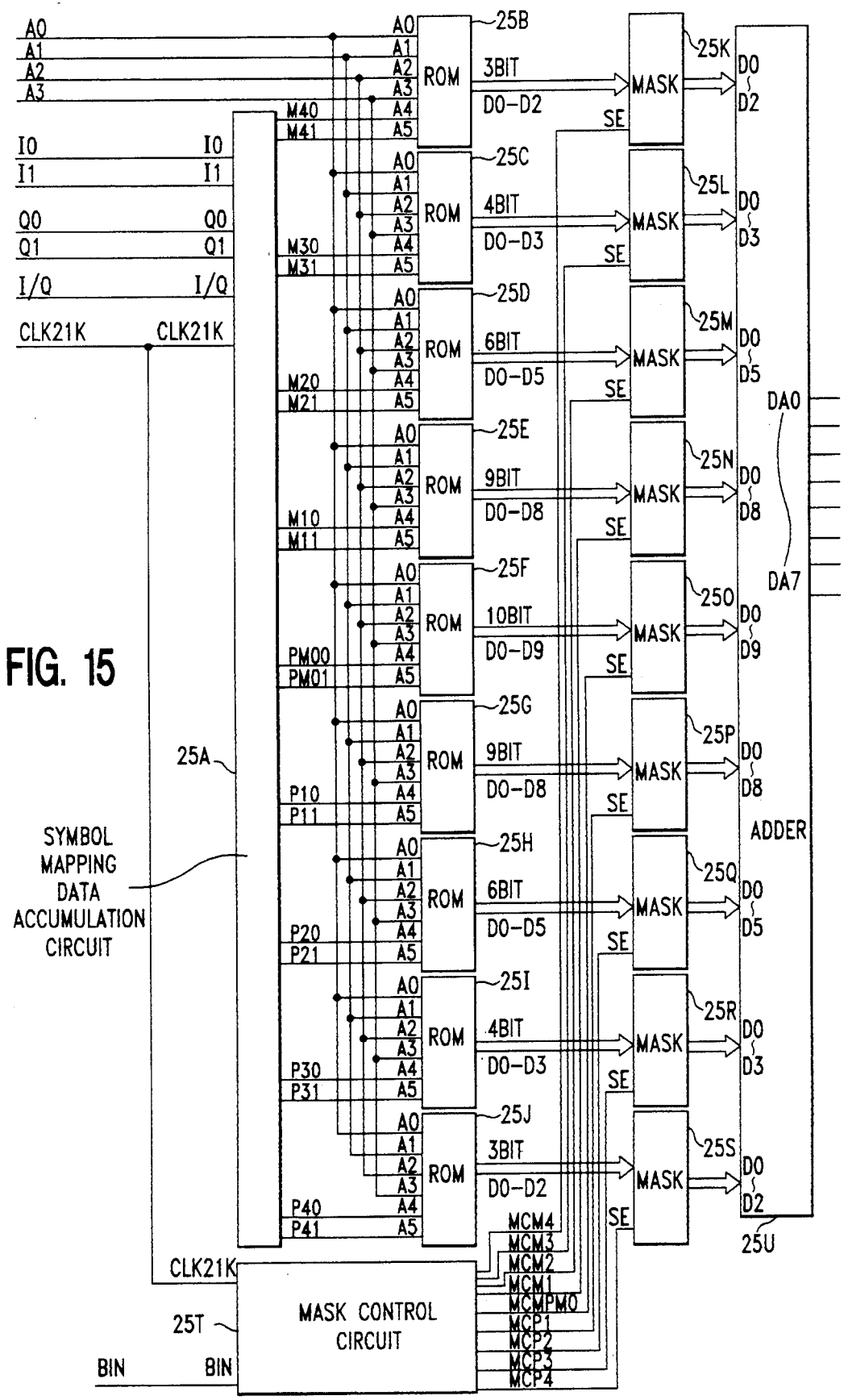
FIG. 15 is a block diagram showing a digital filter constituting a digital modulator according to a second embodiment of the present invention.

FIG. 15 is a block diagram showing a digital filter constituting a digital modulator according to a second embodiment of the present invention. The digital filter shown in FIG. 15 is the same as the digital filter according to the first embodiment shown in FIG. 10 except for the following point, and the description of the common portion will not be repeated. The second embodiment shown in FIG. 15 is directed to providing a digital modulator also applicable to burst transmission based on the symbol tap divided ROM method of the first embodiment as described above.

With reference to FIG. 15, a symbol mapping data accumulation circuit is the same as that of the first embodiment shown in FIG. 10, description of which will not be repeated. In the embodiment of FIG. 15, 18-bit (2×9) symbol mapping data output from the symbol mapping data accumulation circuit 25A are applied to corresponding ROMs 25B–25J for the respective symbol sections. These ROMs 25B–25J are also the same as those of the first embodiment shown in FIG. 10, description of which will not be repeated.

The outputs of these ROMs 25B–25J are applied to corresponding masking circuits 25K to 25S, respectively. These masking circuits serve to prevent generation of spurious transmission by temporarily masking the outputs of the ROMs at the time of each burst transmission. As shown in FIG. 15, the number n of input bits and the number n of output bits of each masking circuit are equal to each other; each masking circuit is structured by n AND gates.

Figure 16:
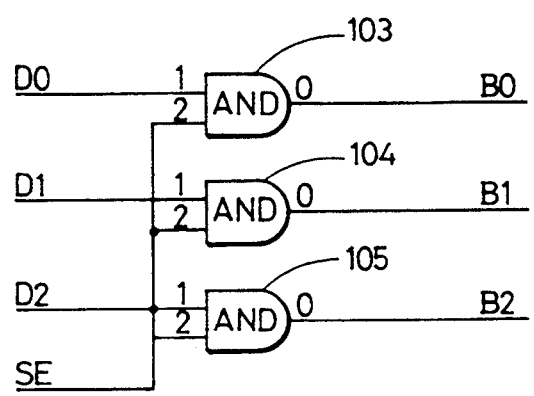
FIG. 16 is a diagram of an exemplary masking circuit shown in FIG. 15.

FIG. 16 is a diagram showing the structure of the masking circuit 25K or 25S as an example of a structure of such a masking circuit. In the example shown in FIG. 16, the masking circuit has a 3-bit input and a 3-bit output and is structured by three AND gates 103–105. When a control output SE from a mask control circuit 25T, as shown in FIG. 15, is "1", the masking circuit as shown in FIG. 16, outputs the inputs D0–D2 as outputs B0–B2, while when the SE is "0", the outputs B0–B2 all attain "0". As for the remaining masking circuits 25L–25R, their structures are basically the same except that the number of AND gates varies according to the number of input and output bits.

Figure 17:
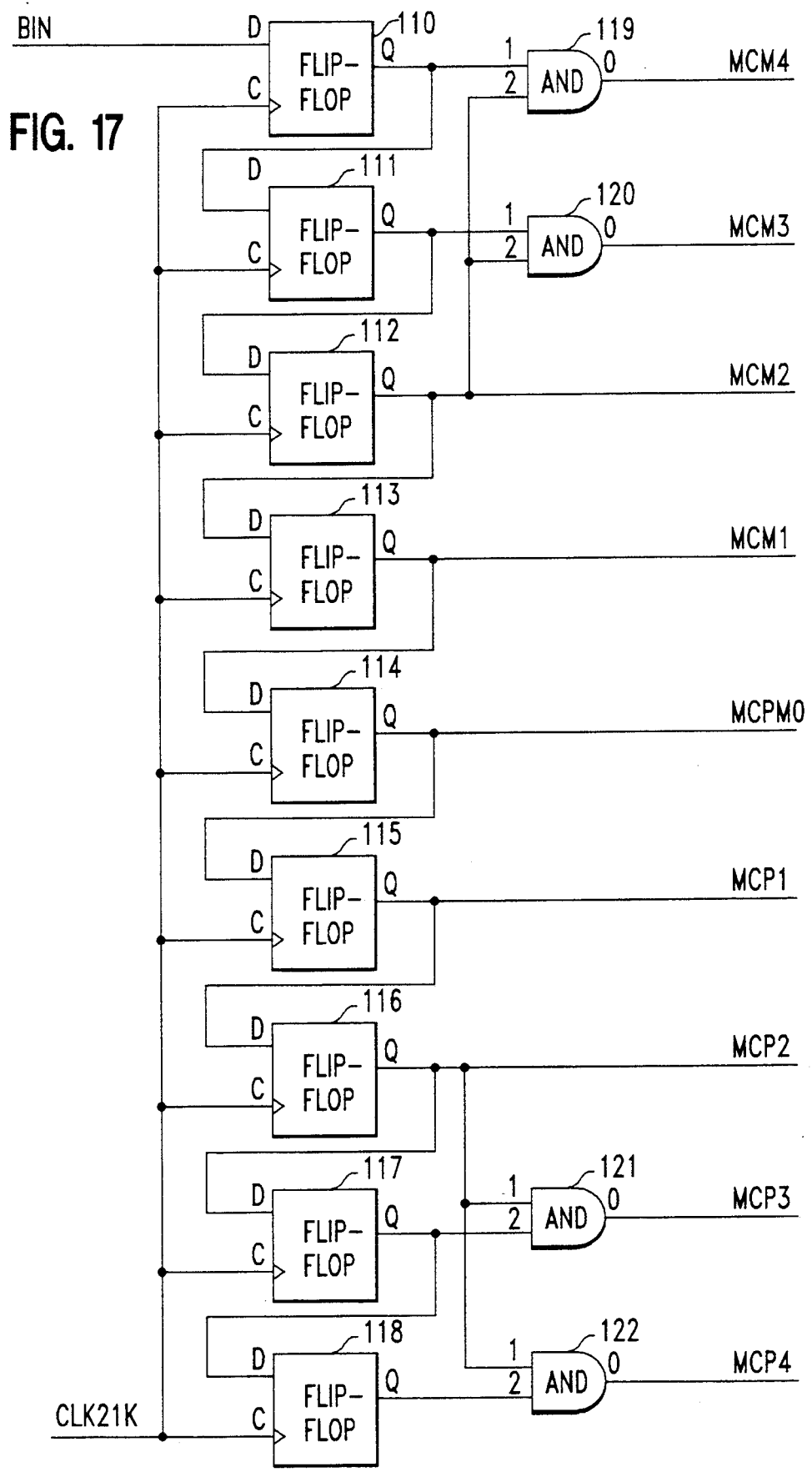
FIG. 17 is a diagram of a mask control circuit shown in FIG. 15.
Figure 18:
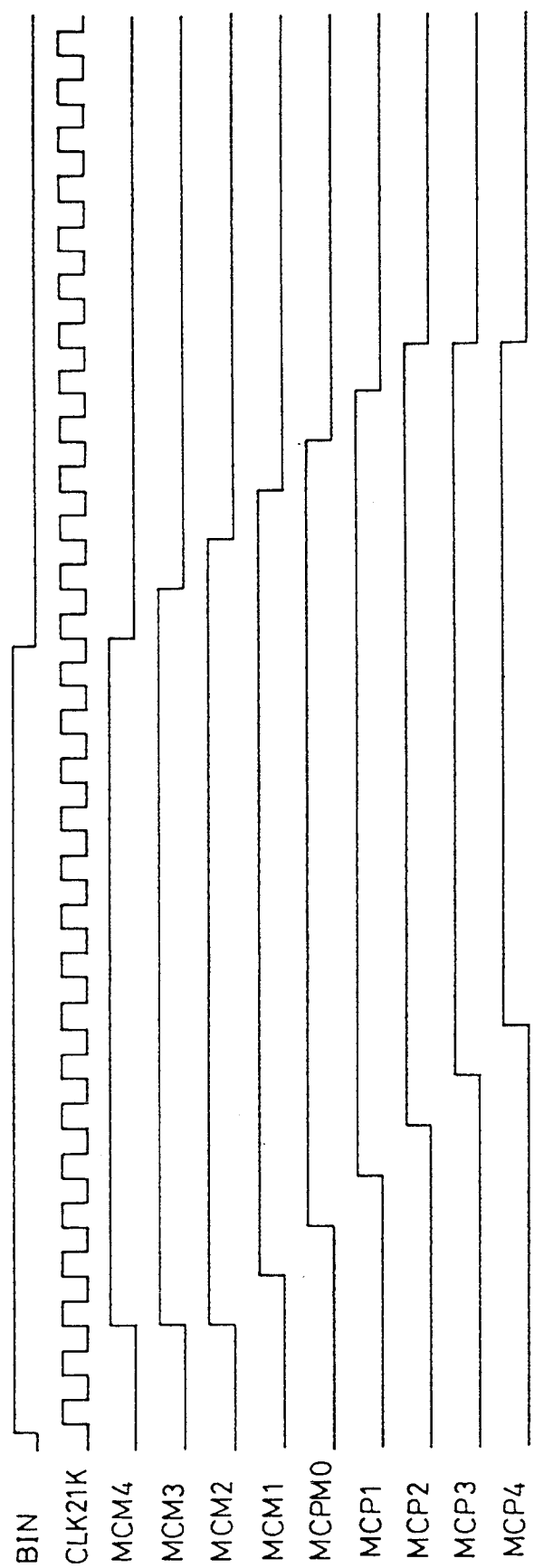
FIG. 18 is a timing chart illustrating operation of the mask control circuit shown in FIG. 17.

FIG. 17 is a block diagram showing the structure of the mask control circuit 25T of FIG. 15. As shown in FIG. 17, the mask control circuit 25T is structured by nine flip-flops 110 to 118 and four AND gates 119 to 122. FIG. 18 is a timing chart illustrating operation of the mask control circuit 25T. With reference to FIGS. 17 and 18, the operation of the mask control circuit 25T will be described as follows.

First, at a rise of a burst transmission, a burst input signal BIN input through the burst input (BURST IN) terminal of FIG. 6 changes from "0" to "1". Then, after two to three symbol periods, control outputs MCM4, MCM3 and MCM2 (shown in FIG. 18) corresponding to the masking circuits 25K–25M simultaneously change from "0" to "1" and further thereafter, control outputs MCM1, MCPM0, MCP1, MCP2, MCP3 and MCP4 corresponding to the remaining masking circuits sequentially change from "0" to "1" in a symbol period.

Thereafter, at a fall of the burst transmission, the burst input signal BIN input from the burst input terminal changes from "1" to "0". Then, the control outputs MCM4, MCM3, MCM2, MCM1, MCPM0 and MCP1 are sequentially changed from "1" to "0" with a delay of a symbol period and in one symbol period later, MCP2, MCP3 and MCP4 are simultaneously changed from "1" to "0".

Thus, by sequentially masking the outputs of ROMs 25B–25J at a timing shown in FIG. 18 at the time of burst transmission, a ramp processing at a rise and a fall of burst is possible to prevent generation of spurious transmissions.

As shown in FIG. 15, the outputs of these masking circuits 25K–25S are added by an adder 25U into a 8-bit digital baseband signal. Subsequent processings are the same as those of the first embodiment and no further description will be made.

While in the above-described second embodiment, a case is made of masking an ROM output by using a masking circuit comprised of AND gates, the masking circuit of FIG. 15 will be unnecessary if each ROM is provided with an address or a dedicated input terminal which renders output data "0". In this case, the control outputs MCM4 to MCP4 of the mask control circuit 25T of FIG. 15 may be connected to the above-described address or the dedicated input terminal which renders the output data "0", and the outputs of the respective ROMs may be directly applied to the adder 25U.

As described in the foregoing, the second embodiment of the present invention enables reduction of an ROM capacity while preventing generation of spurious transmissions at the time of a burst transmission, which leads to a provision of a digital modulator applicable to burst transmission.

Although illustrated in detail, it is clearly understood that the same is by way of illustration and example only and is not to be taken by way of limitation, the spirit and scope of the present invention being limited only by the terms of the appended claims.

What is claimed is:

1. A digital modulator comprising:
   means for differential encoding and mapping a digital baseband signal into a pair of symbol mapping data respectfully corresponding to in-phase and quadrature phase components of said digital baseband signal;
   means for designating burst transmission;
   digital filter means, having a predefined impulse response waveform, wherein said impulse response waveform is divided into symbol sections, said digital filter means further comprising:
   a plurality of memory means, wherein each of said memory means stores numerical values representing a different corresponding one of said symbol sections of said impulse response waveform multiplied by a carrier signal;
   output masking means for selectively setting the numerical values read from said plurality of memory means to zero;
   mask controlling means responsive to a designation of burst transmission by said burst transmission designating means, for controlling said output masking means in a predetermined timing pattern;
   means, connected between said memory means and said encoding and mapping means, for accumulating a predefined number of said pairs of symbol mapping data, said predefined number corresponds to the number of symbol sections into which the impulse response waveform is divided;

means, connected to said accumulating means and operating in response to said accumulated pairs of symbol mapping data, for accessing said numerical values in said plurality of memory means; and means, connected to said plurality of memory means, for summing the accessed numerical values from each of the memory means to produce an output signal of said digital filter means; and converting means, connected to said digital filter means, for converting said output signal of said digital filter means into an analog modulated signal.

2. The digital modulator according to claim 1, wherein said mask controlling means sequentially controls said output masking means on the basis of a symbol period so as to perform a ramp process during a rise and a fall of a burst transmission.

3. The digital modulator according to claim 1, wherein said output masking means includes a plurality of logic gate means provided corresponding to said plurality of memory means, each being closed and opened by the output of said mask controlling means.

* * * * *